United States Patent
Romanov et al.

(10) Patent No.: US 10,221,767 B2
(45) Date of Patent: Mar. 5, 2019

(54) ACTIVELY COOLED BLADE OUTER AIR SEAL

(71) Applicant: United Technologies Corporation, Hartford, CT (US)

(72) Inventors: Dmitriy A. Romanov, Wells, ME (US); Paul M. Lutjen, Kennebunkport, ME (US)

(73) Assignee: United Technologies Corporation, Farmington, CT (US)

( * ) Notice: Subject to any disclaimer, the term of this patent is extended or adjusted under 35 U.S.C. 154(b) by 851 days.

(21) Appl. No.: 14/841,054

(22) Filed: Aug. 31, 2015

(65) Prior Publication Data

US 2016/0061113 A1 Mar. 3, 2016

Related U.S. Application Data

(60) Provisional application No. 62/044,466, filed on Sep. 2, 2014.

(51) Int. Cl.
*F01D 11/08* (2006.01)
*F02C 7/18* (2006.01)
(Continued)

(52) U.S. Cl.
CPC .................. *F02C 7/18* (2013.01); *B22C 9/10* (2013.01); *F01D 5/187* (2013.01); *F01D 9/041* (2013.01); *F01D 11/08* (2013.01); *F01D 25/12* (2013.01); *F02C 3/04* (2013.01); *F02C 7/28* (2013.01); *B22C 9/04* (2013.01); *F05D 2220/32* (2013.01); *F05D 2230/211* (2013.01); *F05D 2240/11* (2013.01); *F05D 2240/12* (2013.01);
(Continued)

(58) Field of Classification Search
CPC ...... F02C 7/18; F02C 7/28; F02C 3/04; B22C 9/10; B22C 9/04; F01D 5/187; F01D 11/08; F01D 9/041; F01D 25/12; F05D 2260/204; F05D 2240/11; F05D 2230/211; F05D 2240/30; F05D 2240/12; F05D 2220/32; F05D 2260/20; F05D 2240/55

See application file for complete search history.

(56) References Cited

U.S. PATENT DOCUMENTS 5,374,161 A 12/1994 Kelch et al.
5,375,973 A 12/1994 Sloop et al.
(Continued)

FOREIGN PATENT DOCUMENTS

EP 1055800 11/2000
EP 2045445 4/2009

OTHER PUBLICATIONS

Extended European Search Report for Application No. 15183430.6 dated Mar. 15, 2016.

*Primary Examiner* — Eldon T Brockman
(74) *Attorney, Agent, or Firm* — Carlson, Gaskey & Olds, P.C.

(57) ABSTRACT

A turbine component includes a main body with an upstream end and a downstream end. A cooling passage network is interior to the main body and has multiple cooling passages. A shared passage wall in the cooling passage network includes a cross passage opening connecting each passage partially defined by the shared passage wall. The cross passage further including a pressure balancing feature operable to reduce a local pressure differential in a fluid pressure in each adjacent passage at the cross passage.

20 Claims, 7 Drawing Sheets

(51) Int. Cl.

| | |
|---|---|
| *F02C 3/04* | (2006.01) |
| *F02C 7/28* | (2006.01) |
| *F01D 9/04* | (2006.01) |
| *F01D 25/12* | (2006.01) |
| *F01D 5/18* | (2006.01) |
| *B22C 9/10* | (2006.01) |
| *B22C 9/04* | (2006.01) |

(52) U.S. Cl.
CPC ...... *F05D 2240/30* (2013.01); *F05D 2240/55* (2013.01); *F05D 2260/20* (2013.01); *F05D 2260/204* (2013.01); *F05D 2300/13* (2013.01); *Y02T 50/676* (2013.01)

(56) References Cited

U.S. PATENT DOCUMENTS

| | | | |
|---|---|---|---|
| 6,234,753 B1 * | 5/2001 | Lee | F01D 5/187 |
| | | | 415/115 |
| 6,955,523 B2 * | 10/2005 | McClelland | F01D 5/14 |
| | | | 415/115 |
| 7,547,190 B1 * | 6/2009 | Liang | F01D 5/186 |
| | | | 416/97 R |
| 7,597,533 B1 | 10/2009 | Liang | |
| 7,650,926 B2 | 1/2010 | Tholen | |
| 7,665,962 B1 | 2/2010 | Liang | |
| 7,686,068 B2 | 3/2010 | Tholen et al. | |
| 7,874,792 B2 | 1/2011 | Tholen et al. | |
| 7,959,407 B2 | 6/2011 | Tholen | |

\* cited by examiner

ACTIVELY COOLED BLADE OUTER AIR SEAL

CROSS-REFERENCE TO RELATED APPLICATION

This application claims priority to U.S. Provisional Application No. 62/044,466 filed Sep. 2, 2014.

STATEMENT REGARDING FEDERALLY SPONSORED RESEARCH OR DEVELOPMENT

This disclosure was made with Government support under FA8650-09-D-2923-0021 awarded by The United States Air Force. The Government has certain rights in this disclosure.

TECHNICAL FIELD

The present disclosure relates generally to blade seals for a gas turbine engine, and more specifically to blade outer air seals including refractory metal core cooling passages.

BACKGROUND

Axial flow gas turbine engines, such as those utilized in commercial aircraft, typically include a compressor that draws air in and compresses the air. The compressed air is passed along a primary flow path to a combustor, where the air is mixed with fuel and ignited. The resultant gasses are expelled along an annular flow path into a turbine section, where the resultant gasses expand and drive the turbine section to rotate. The initial air, the air fuel mixture, and the gasses resultant from combustion in the combustor are referred to as a working fluid. During operation, the working fluid travels along an annular flow path that extends axially through the compressor, combustor and turbine sections. In typical example engines, a stator assembly extends about the annular flow path for confining the working fluid to the flow path and for directing the fluid along the flow path.

Multiple rotor assemblies are positioned in the turbine section and each assembly includes multiple rotor blades which extend radially outward across the flow path. A blade outer air seal (BOAS) circumscribes the rotor blades of each rotor assembly and confines the working fluid to the flow path. The blade outer air seal further maintains a proper rotor tip clearance between the rotor tip and the outer diameter of the annular flow path.

The rotor assemblies are positioned in a hot gas environment within the flow path, and the corresponding blade outer air seals use forced cooling in order to prevent heat damage to the blade outer air seal. Most modern blade outer air seals use either a refractory metal core (RMC) microcircuit, a refractory metal core super convective shroud (RMC SCS), or conventional super convective shroud combined with impingement or film cooling techniques to provide the forced cooling.

Refractory metal core cooling utilizes cooling passages internal to the blade outer air seal, with the internal passages including inlet holes, exit holes and trip strips on a hot side of the internal passage. The hot side of the internal passage is the side of the passage facing the annular flow path.

The refractory metal cores are a cast component. In order to achieve two or more supporting points for each channel during the casting, and thereby ensure proper casting, at least one connector is used at the boundary between each channel and a neighboring channel. As a result of the connectors, openings referred to as "cross passages" are created in the walls separating the channels. During operation, however, the internal pressures within each channel are different from the internal pressure of the neighboring channels. This pressure variation leads to cross channel leakage through the cross passages. Cross channel leakage reduces convection efficiency of the blade outer air seal, causing the blade outer air seal to require a higher overall cooling flow rate, or resulting in a reduced lifespan of the blade outer air seal.

SUMMARY OF THE INVENTION

In an exemplary embodiment, a turbine component includes a main body having an upstream end and a downstream end, a cooling passage network interior to the main body, the cooling passage network including a plurality of cooling passages, at least one cooling passage in the plurality of cooling passages being defined by an inlet, an outlet, and at least one shared passage wall, wherein the shared passage wall is a shared passage wall of two cooling passages in the plurality of cooling passages, the shared passage wall further comprising a cross passage opening connecting each passage partially defined by the shared passage wall, and the cross passage further including a pressure balancing feature operable to reduce a local pressure differential in a fluid pressure in each adjacent passage at the cross passage.

In a further example of the above described exemplary embodiment, the pressure balancing feature comprises an obstruction feature protruding into flow of a first adjacent passage, wherein the obstruction feature generates a localized pressure increase in the first adjacent passage at the cross passage, and wherein the first adjacent passage is at a lower pressure at the cross passage than the pressure of a second adjacent passage at the cross passage.

In a further example of any of the above described exemplary embodiments, the obstruction feature is a surface of the wall and wherein the surface is approximately normal to fluid flow through the first adjacent passage.

In a further example of any of the above described exemplary embodiments, the obstruction feature protrudes from a downstream edge of the cross passage relative to flow through the first adjacent passage.

In a further example of any of the above described exemplary embodiments, the pressure balancing feature further comprises a ramp feature protruding from the shared wall into the second adjacent passage, wherein the ramp feature generates a localized pressure decrease in the second adjacent passage at the cross passage.

In a further example of any of the above described exemplary embodiments, the ramp feature comprises a sloped surface protruding into the second adjacent passage, the sloped surface being at an obtuse angle relative to fluid flow through the second adjacent passage.

In a further example of any of the above described exemplary embodiments, fluid flow through the first adjacent passage and the second adjacent passage is in opposing directions, and wherein the ramp feature protrudes into the second adjacent passage from an upstream edge of the cross passage, relative to fluid flow through the second adjacent passage.

In a further example of any of the above described exemplary embodiments, fluid flow through the first adjacent passage and the second adjacent passage are in the same direction, and wherein the ramp feature protrudes into the second adjacent passage along the shared wall upstream of the cross passage.

A further example of any of the above described exemplary embodiments further includes a leakage minimization feature at the cross passage, wherein the leakage minimization feature is a portion of the shared wall extending through the cross passage, and thereby restricting a height of the cross passage.

In a further example of any of the above described exemplary embodiments, the pressure balancing feature comprises a ramp feature protruding from the shared wall into a second adjacent passage upstream of the cross passage, wherein the ramp feature generates a localized pressure decrease in the second adjacent passage at the cross passage.

In another exemplary embodiment, a method for minimizing cross passage flow in a gas turbine engine component includes reducing a local pressure differential between two adjacent passages at a cross passage joining the two adjacent passages using a pressure balancing feature integral to a shared wall of the two adjacent passages, wherein a fluid pressure in a first of the two adjacent passages at the cross passage is lower than a pressure in a second of the two adjacent passages at the cross passage.

In a further example of any of the above described exemplary embodiments, locally equalizing the pressure comprises increasing a pressure in a first passage of the two adjacent passages using an obstruction protruding from the shared wall into the first passage at a downstream edge of the cross passage, relative to flow through the first passage, thereby locally increasing the pressure in the first passage at the cross passage.

In a further example of any of the above described exemplary embodiments, locally equalizing the pressure comprises decreasing a pressure in the second passage of the two adjacent passages using a ramp feature protruding from the shared wall into the second passage at an upstream edge of the cross passage, relative to fluid flowing through the first passage.

In a further example of any of the above described exemplary embodiments, locally equalizing the pressure comprises decreasing a pressure in the second passage of the two adjacent passages using a ramp feature protruding from the shared wall into the second passage at an upstream edge of the cross passage, relative to fluid flowing through the second passage.

A further example of any of the above described exemplary embodiments further includes minimizing leakage through the cross passage using a leakage minimization feature, wherein the leakage minimization feature is a portion of the shared wall passing through the cross passage, and thereby reduces an area of the cross passage.

In another exemplary embodiment, a gas turbine engine includes a compressor section, a combustor fluidly connected to the compressor section via a flow path, a turbine section fluidly connected to the combustor via the flow path, wherein the turbine section includes at least one rotor, a plurality of static components disposed circumferentially about the flow path radially outward of the at least one of the rotor, wherein at least one of a static component in the plurality of static components and a rotor in the at least one rotor comprises: a main body having an upstream end and a downstream end, a cooling passage network interior to the main body, the cooling passage network including a plurality of cooling passages, at least one cooling passage in the plurality of cooling passages being defined by an inlet, an outlet, and at least one shared passage wall, wherein the shared passage wall is a shared passage wall of two cooling passages in the plurality of cooling passage, the shared passage wall further comprising a cross passage opening connecting each passage partially defined by the shared passage wall, and the cross passage further including a pressure balancing feature operable to reduce a local pressure differential in a fluid pressure in each adjacent passage at the cross passage.

In a further example of any of the above described exemplary embodiments, the static or rotating component comprises a refractory metal core, and wherein the refractory metal core at least partially defines the cooling passage network.

In a further example of any of the above described exemplary embodiments, the pressure balancing feature comprises an obstruction feature protruding into flow of a first adjacent passage, wherein the obstruction feature generates a localized pressure increase in the first adjacent passage at the cross passage, and wherein the first adjacent passage is at a lower pressure at the cross passage than the pressure of a second adjacent passage at the cross passage.

In a further example of any of the above described exemplary embodiments, the pressure balancing feature further comprises a ramp feature protruding from the shared wall into the second adjacent passage, wherein the ramp feature generates a localized pressure decrease in the second adjacent passage at the cross passage.

In a further example of any of the above described exemplary embodiments, a fluid flow direction in each cooling passage in the cooling passage network is opposite a fluid flow direction of each adjacent cooling passage.

These and other features of the present invention can be best understood from the following specification and drawings, the following of which is a brief description.

DETAILED DESCRIPTION OF AN EMBODIMENT

Figure 1:
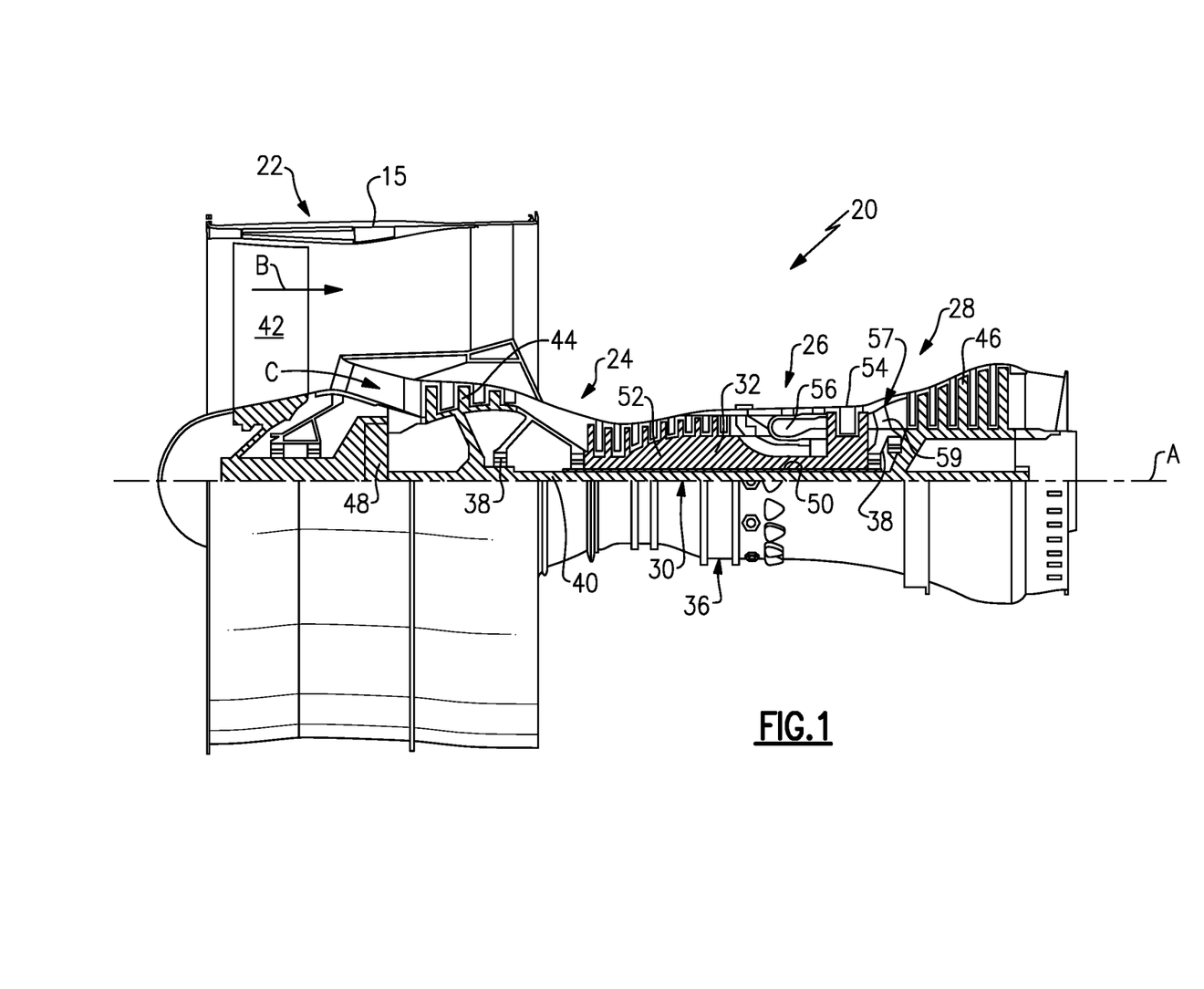
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed" as disclosed herein according to one non-limiting embodiment is less than about 1150 ft/second.

In order to maintain a proper clearance between rotors within the turbine section 28 and an outer diameter of the flow path, blade outer air seals are included in the flow path radially outward of the rotors. The blade outer air seals are disposed circumferentially about the outer diameter of the flow path. Because the blade outer air seals are disposed in the hot gas flow path, the blade outer air seals are actively cooled to mitigate potential damage resulting from the extreme temperatures.

Figure 2:
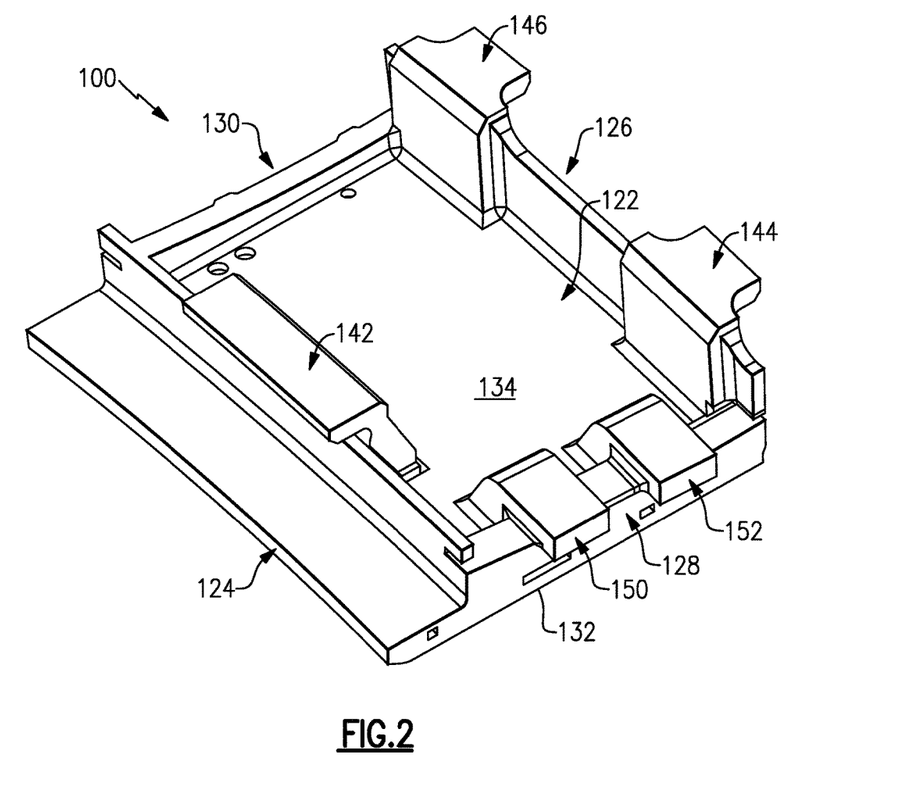
FIG. 2 schematically illustrates an example blade outer air seal for a gas turbine engine.
Figure 3:
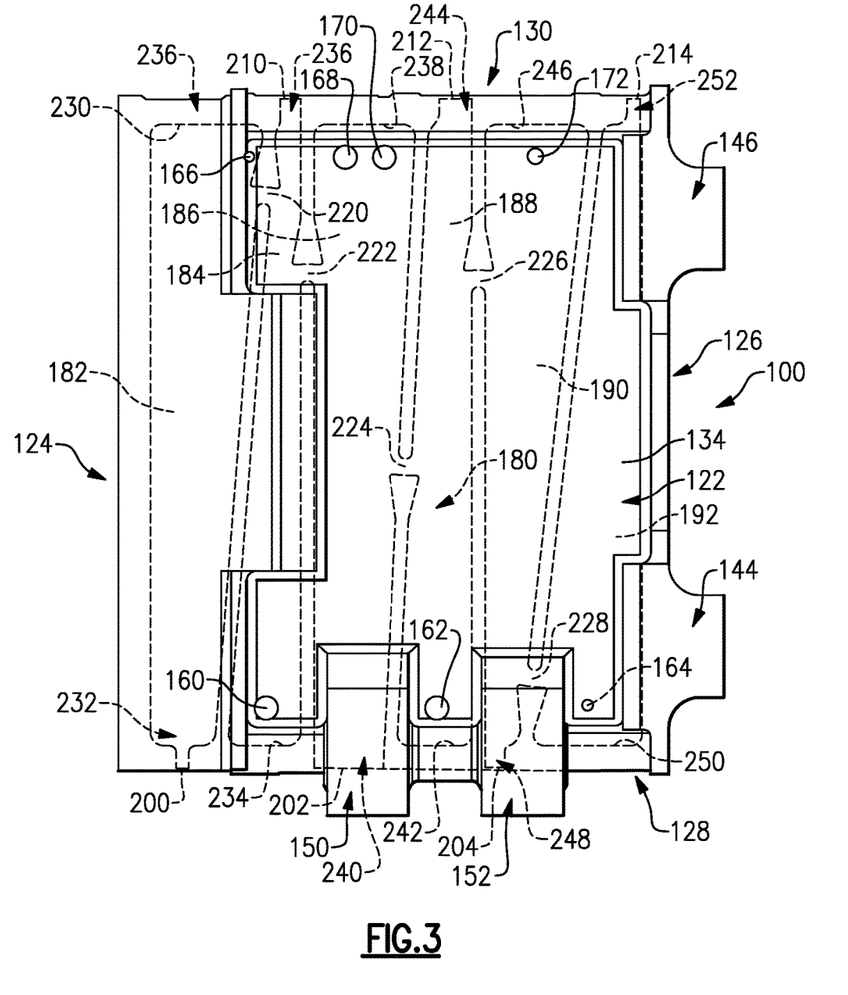
FIG. 3 schematically illustrates a top view of the BOAS 100 of FIG. 2, with select internal features illustrated via dashed lines.

FIG. 2 schematically illustrates an isometric view of an example blade outer air seal (BOAS) 100. FIG. 3 schematically illustrates a top view of the BOAS 100 of FIG. 2, with select internal features illustrated via dashed lines. The BOAS 100 has a main body portion 122 having a leading/upstream/forward end 124 and a trailing/downstream/aft end 126. The body portion 122 has first and second circumferential ends or matefaces 128 and 130. The body portion 122 has an inner diameter face 132 and an outer diameter face 134. To mount the BOAS 100 to an environmental structure, the exemplary BOAS 100 has a plurality of mounting hooks. The exemplary BOAS 100 has a single central forward mounting hook 142 having a forwardly-projecting distal portion recessed aft of the forward end 124. The exemplary BOAS 100 has a pair of first and second aft hooks 144 and 146 having rearwardly-projecting distal portions protruding aft beyond the aft end 126.

A circumferential ring array of a plurality of the BOAS 100 may encircle an associated blade stage of a gas turbine engine. The assembled inner diameter faces 132 thus locally bound an outboard extreme of the core flow path. The BOAS 100 may have features for interlocking the array. Exemplary features include finger and shiplap joints. The exemplary BOAS 100 has a pair of fore and aft fingers 150 and 152 projecting from the first circumferential end 128 and which, when assembled, radially outboard of the second circumferential end 130 of the adjacent BOAS.

The BOAS 100 may be air-cooled or cooled using another coolant. For example, bleed air may be directed to a chamber immediately outboard of the face 134. The bleed air may be directed through ports 160, 162, 164, 166, 168, 170, and 172 (illustrated in FIG. 3) to an internal cooling passageway network 180. The exemplary network 180 includes a plurality of circumferentially-extending passages 182, 184, 186, 188, 190, and 192. The network 180 includes multiple outlets. Exemplary outlets include outlets along the circumferential ends 128 and 130. In the exemplary BOAS 100, outlets 200, 202, and 204 are formed along the first circumferential end 128 and outlets 210, 212, and 214 are formed along the second circumferential end 130. As is discussed in further detail below, adjacent passages 182, 184, 186, 188, 190, 192 are interconnected by cross passages 220, 222, 224, 226, and 228.

In operation, inlet 166 feeds passage 182 near a closed end 230 of the passage 182. The air flows through the passage 182 to an outlet 200 which is in a neck region at an opposite end 232 of the passage 182. Similarly, inlet 160 feeds passage 184 near a closed end 234. The outlet 210 is at a neck region at the other end 236. The inlets 168 and 170 feed the passage 186 near a closed end 238. The outlet 202 is formed at the other end 240. Inlet 162 feeds the passage 188 near a closed end 242. The outlet 212 is at the other end 244. The inlet 172 feeds the passage 190 near a closed end 246. The outlet 204 is in a neck region at the other end 248. The inlet 164 feeds the passage 192 near a closed end 250. The outlet 214 is formed in a neck region at the other end 252.

As the cooling air is passed through each passage 182, 184, 186, 188, 190, 192, heat from the surface of the BOAS 100 facing the annular flow path of the gas turbine engine 20 is absorbed by the cooling air. The heated air is then exhausted from the BOAS 100 through the outlets, and the BOAS 100 is actively cooled. As described above, each passage 182, 184, 186, 188, 190, 192 of the network 180 includes at least one cross passage 220, 222, 224, 226, 228 connecting the passage 182, 184, 186, 188, 190, 192 to an adjacent passage 180, 182, 184, 186, 188, 190, 192.

The cross passages 220, 222, 224, 226, 228 result from the casting process used to create the refractory metal core. Due to pressure differences between the two connected passages at the cross passages, cross flow from the higher pressure passage to the lower pressure passage occurs, absent some form of mitigation. In an ideal BOAS 100, each of the cross passages 220, 222, 224, 226, 228 is centrally positioned in order to as closely match the pressure between the adjoining passages as possible. Due to practical considerations in the casting however, the cross passages 220, 222, 224, 226, 228 are distributed at varying positions on the adjoining walls, and are not centrally located.

In order to reduce the pressure differential at the cross passages 220, 222, 224, 226, 228, and thereby reduce crossflow between the passages 182, 184, 186, 188, 190, 192, through the cross passages 220, 222, 224, 226, 228, each cross passage 182, 184, 186, 188, 190, 192 includes at least one pressure balancing feature (illustrated in FIGS. 4, 5, 6B, 7 and 8). In the illustrated Figures the pressure balancing features are exaggerated for illustrative effect, and may not be as large as illustrated relative to the remainder of the BOAS 100 in a practical implementation.

Figure 4:
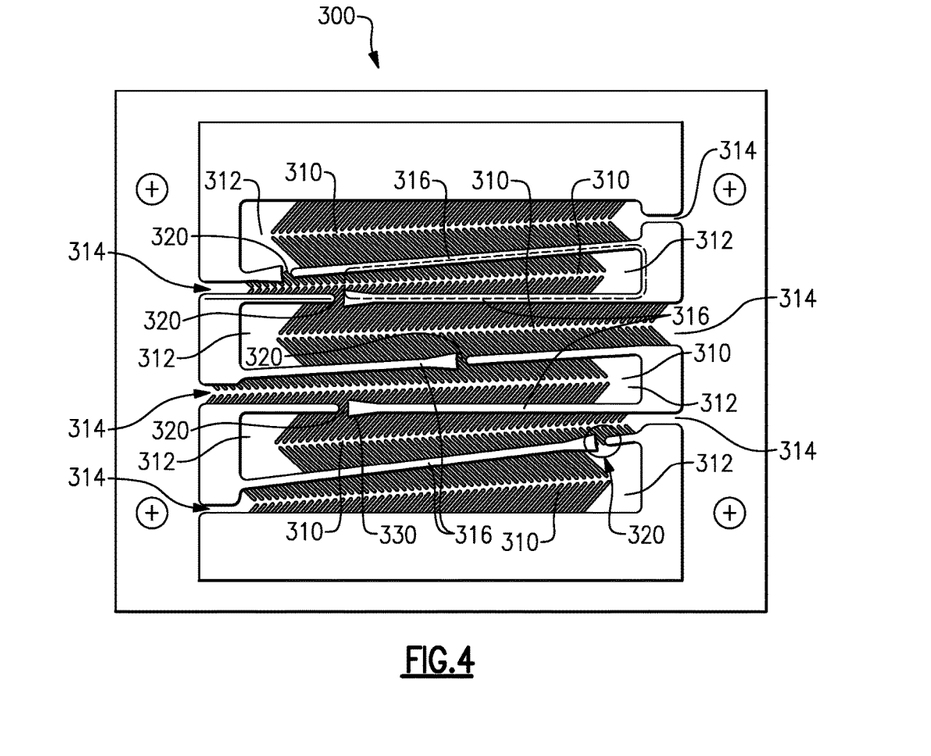
FIG. 4 schematically illustrates a top view of the passages of FIGS. 2 and 3, including flow illustrations.

FIG. 4 schematically illustrates a top view of a refractory metal core 300 for a BOAS, such as the BOAS 100 illustrated in FIGS. 2 and 3. The refractory metal core 300 includes multiple passages 310. The passages 310 each include an inlet end 312 having a larger width, with the passage 310 narrowing as a coolant, such as air, approaches an outlet 314 on an end opposite the inlet end 312. Each passage 310 is defined by at least one wall 316 that also defines an adjoining passage 310. As described above, with regards to FIGS. 2 and 3, each wall 316 includes a cross passage 320 that interconnects the passages 310 bounded by the wall 316. As described above, the cross passages 320 are an artifact of the casting process used to create the refractory metal core 300.

During operation, fluid enters each passage 310 at the first end 312 through an inlet corresponding to each passage 310. The fluid flows along the passage 310 to the outlet 314. As the fluid flows through the passage 310, the pressure in the passage 310 decreases. Further, as a result of the alternating current flow directions of the passages 310, the reduction in gaspath pressure at the exits due to work extraction from the blade, and the varying dimensions of the passages 310, the location where the pressure in adjacent passages 310 is most even will vary in practical implementations.

In order to minimize the cross flow between the passages 310, and to minimize the effect of the pressure differential and the cross passages 320, a pressure balancing feature 330 is incorporated in the design of the wall 316.

Figure 5:
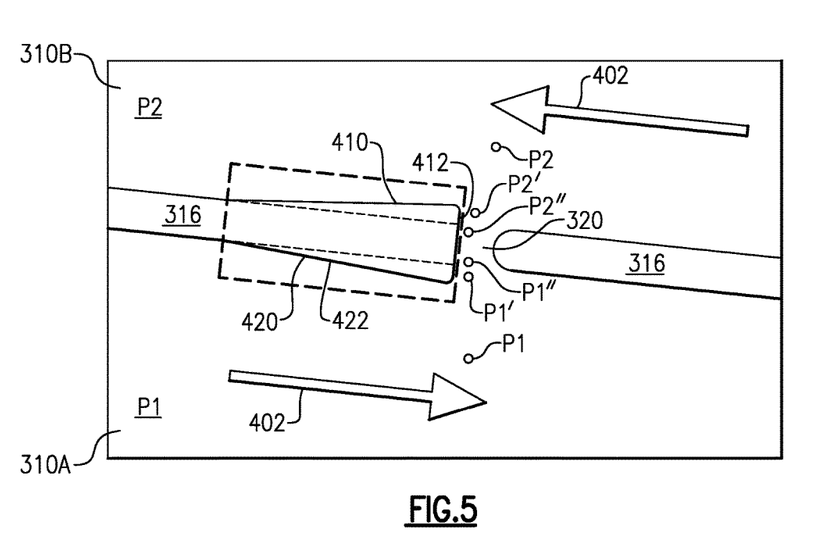
FIG. 5 schematically illustrates an example pressure balancing feature at a cross passage.

With continued reference to FIG. 4, and with like numerals indicating like elements, FIG. 5 illustrates an example pressure balancing feature 330 in greater detail. Two passages 310A and 310B are partially visible in FIG. 5. The direction of coolant flow through each passage 310A, 310B is identified by the flow arrows 402. The pressure of fluid in passage 310A is generally referred to as P1, and the pressure of fluid in passage 310B is generally referred to as P2. The wall 316 defining both passages 310A, 310B includes an obstruction feature 410 and a ramp feature 420 that combined constitute a pressure balancing feature 330. Absent the obstruction feature 410 and the ramp feature 420, the pressure in passage 310B is lower than the pressure in passage 310A at the cross passage 320.

The obstruction feature 410 protrudes into the flow path of passage 310B and provides a sharp barrier to flow through passage 310B via a wall surface 412 approximately normal to the wall 316 and approximately normal to the direction of fluid flow. The barrier to flow created by the obstruction feature 410 results in an increase in pressure at point P2', and a further increase in pressure at point P2" in the flow through passage 310B.

The ramp feature 420 protrudes gradually from the wall 316 into the flow 402 of passage 310A. The ramp feature 420 is defined by a sloped surface 422 that extends from the wall 316 at an obtuse angle relative to the fluid flow. The ramp structure 420 extends into the adjacent passage 310A. The magnitude of the angle determines the severity of the pressure decrease in passage 310A at the cross passage 320, with a smaller angle generally increasing the magnitude of the pressure decrease. In the illustrated example P1' has a lower pressure than P1, and P1" has a lower pressure than P1'. While illustrated and described herein as a straight protrusion into the flow path of passage 310A, the wall 422 of the ramp feature can be a curved surface, or any other surface geometry providing the ramp structure.

With regards to both the obstruction feature 410 and the ramp feature 420, the combined effect of the balancing feature 330 is to provide a localized pressure equalization affect at the cross passage 320, and thereby minimize cross flow between passage 310A and 310B. In the illustrated example, the obstruction feature 410 increases the pressure P2", and the ramp feature 420 decreases the pressure P1" such that P2" and P1" are approximately equal pressures and cross flow between passage 310A and 310B is eliminated. In alternative examples, P2" and P1" are closer to equal than P1 and P2, but are not equal, and cross flow is minimized but not eliminated.

In alternate examples, the balancing feature 330 can be either the obstruction feature 410, or the ramp feature 420 individually, without the inclusion of the other feature 410, 420.

Figure 6A:
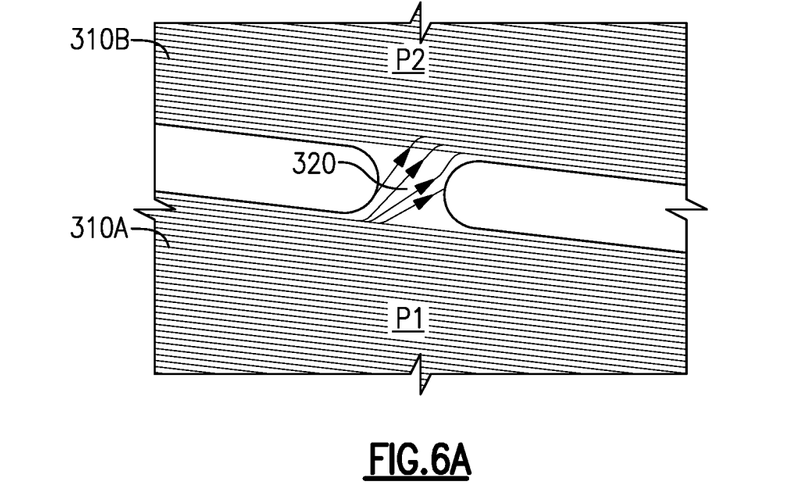
FIG. 6A illustrate a flow field at a cross passage not including a pressure balancing feature.
Figure 6B:
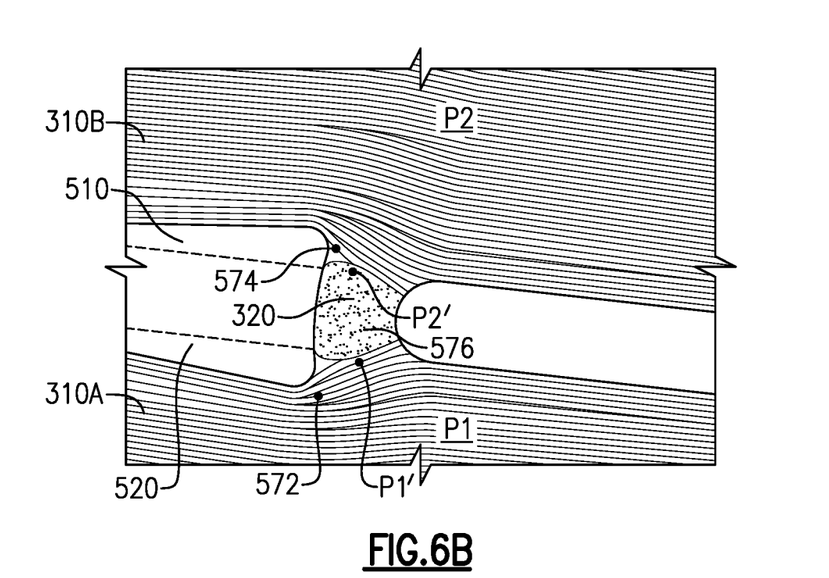
FIG. 6B schematically illustrates a flow field at a cross passage including a pressure balancing feature.

With continued reference to the example of FIG. 5, and with like numerals indicating like elements, FIGS. 6A and 6B illustrate a flow field at a cross passage 320 not including the balancing feature 330 (FIG. 6A) and a flow field at a cross passage 320 including the balancing feature 330 (FIG. 6B). As with the example of FIG. 5, the cross passage 320 links two passages 310A, 310B, with P1 generally referring to the pressure in the lower passage 310A and P2 generally refers to the pressure in the upper passage 310B.

In the example of FIG. 6A, P1 is higher than P2 at the cross passage 320, and flow crosses from the lower passage 310A into the upper passage 310B through the cross passage 320 due to the pressure differential.

Referring now to the example of FIG. 6B, the implementation of the ramp feature 520 forces the flow through passage 310A at point 572 away from the cross passage 320, resulting in a localized pressure decrease at point P1'. Similarly, the obstruction feature 510 protruding into the coolant flow through passage 310B, blocks coolant flow at point 574, resulting in a localized pressure buildup at point P2'. The combined effect of the localized pressure decrease at P1' and pressure buildup at P2' in the respective passages 310A, 310B causes an eddy 576 to form at the cross passage 320. The eddy 576 further blocks leakage through the cross passage 320, thereby minimizing or eliminating the flow of air through the cross passage 320.

One of skill in the art, having the benefit of this disclosure will understand that either the obstruction feature 510 or the ramp feature 520 can be utilized independently to achieve the corresponding localized pressure change, and reduce the pressure differential at the cross passage 320. Further, one of skill in the art will recognize that the magnitude of the localized pressure change in each of the structures depends on the distance that the structure protrudes into the flow of the corresponding passage 310A, 310B.

Figure 7:
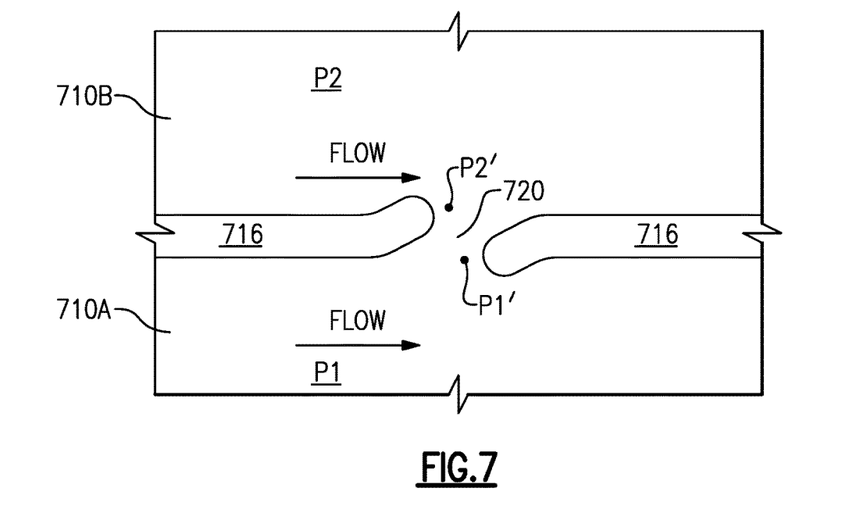
FIG. 7 illustrates an alternate pressure balancing feature for utilization in a wall defining two adjoining passages sharing a flow direction.

In some example blade outer air seals 100, the coolant flowing through adjacent passages is flowing in the same direction, rather than the previously illustrated opposing directions. FIG. 7 schematically illustrates an adaption of the pressure balancing feature 330 of FIGS. 4, 5, 6A and 6B for utilization in a blade outer air seal including adjacent passages 710A, 710B having the same flow direction.

The passages 710A, 710B include a coolant, such as forced air, flowing in the same direction along the illustrated flow lines. A wall 716 is the boundary between the two passages 710A, 710B, and defines at least one side of each of the passages 710A, 710B. Pressure in the second passage 710B is generally referred to as P2. Pressure in the first passage 710A is generally referred to as P1, and is lower than the pressure P2 in the second passage 710B.

Since the flow direction is the same for each of the passages 710A, 710B, a protrusion into the flow from an upstream side of a cross passage 720 between the two passages 710A, 710B acts as a ramp feature, and provides a localized pressure decrease immediately after the ramp, as described above. If the pressure balancing feature 330 illustrated in FIGS. 4 and 5 is utilized, the balancing feature 330 operates as a ramp in both passages 710A, 710B and decreases the pressure in both passages 710A, 710B at the cross passage 720.

Instead, the wall 716 extends into the higher pressure passage 710B at an upstream side of the cross passage 720, and extends into the lower pressure passage 710A at a downstream side of the cross passage 720. The extension into the higher pressure passage 710B at the upstream side operates in the same manner as the ramp portions previously describe and creates a localized pressure drop at P2'. The extension into the lower pressure passage 710A at the downstream side of the cross passage 720 operates in the same manner as the obstruction features described above and creates a localized pressure increase at P1'.

The localized pressure increases and decreases balance the pressures between the two passages 710A, 710B, thereby minimizing occurrences of crossover flow between the two passages 710A, 710B.

Figure 8:
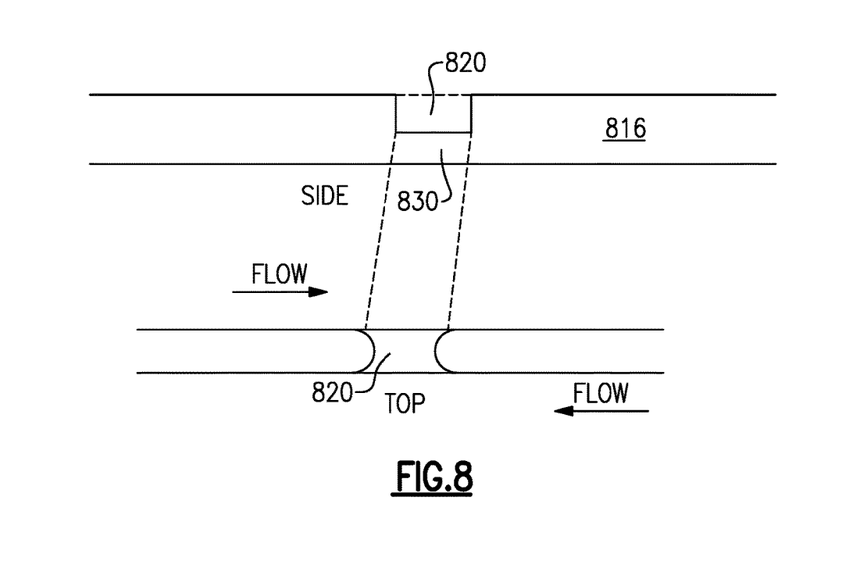
FIG. 8 schematically illustrates another alternative pressure balancing feature for utilization in any blade outer air seal.

In some example blade outer air seals, the walls of each passage are limited to a uniform thickness due to casting limitations or other design constraints. FIG. 8 schematically illustrates a top view and a side view of an example wall 816 between two adjoining cooling passages in a blade outer air seal including this kind of design constraint. The wall 816 includes a cross passage 820 having a leakage minimization feature 830 that operates to reduce the impact of a pressure differential between the two passages defined by the wall 816. Unlike the examples illustrated in each of the preceding Figures, the example of FIG. 8 reduces leakage across the cross passage 820 by restricting the area of the cross passage 820. In order to restrict the area of the cross passage 820, the wall 816 extends radially outward from a radially inner surface of the blade outer air seal.

In each of the preceding examples of FIGS. 4-7, the wall defining adjacent passages extends from the inner diameter of the blade outer air seal to the outer diameter of the blade outer air seal, with the exception of the cross passages. At each of the cross passages, the wall is omitted entirely. In contrast to the above described designs, the wall 816, illustrated in FIG. 8 at the cross passage extends partially outward from the inner surface of the blade outer air seal at the cross passage 820. By extending the wall partially radially outward, the area of the cross passage 820 is reduced, and the amount of cooling fluid that can leak between adjacent passages through the cross passage 820 is reduced.

One of skill in the art will further understand that the reduced cross passage area of FIG. 8 can be utilized in conjunction with the pressure balancing features of the previous examples to further reduce leakage through the cross passages.

Furthermore, while the above is described with regards to a geared turbofan engine including blade outer air seals, one of skill in the art will understand that the above disclosure can be applied to any turbine utilizing blade outer air seals including, but not limited to, direct drive turbines, land based turbines, or any other turbine based machine.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A turbine component comprising:
   a main body having an upstream end and a downstream end, wherein the main body is a blade outer air seal body;
   a cooling passage network interior to said main body, the cooling passage network including a plurality of cooling passages;

at least one cooling passage in said plurality of cooling passages being defined by an inlet, an outlet, and at least one shared passage wall, wherein said shared passage wall is a shared passage wall of two cooling passages in said plurality of cooling passages, said shared passage wall further comprising a cross passage opening connecting each passage partially defined by said shared passage wall; and said cross passage opening further including a pressure balancing feature operable to reduce a local pressure differential in a fluid pressure in each adjacent passage at the cross passage opening; and further comprising a leakage minimization feature at said cross passage opening, wherein said leakage minimization feature is a portion of said shared wall extending through said cross passage, and thereby restricting a height of said cross passage opening.

2. The turbine component of claim 1, wherein said pressure balancing feature comprises an obstruction feature protruding into flow of a first adjacent passage, wherein the obstruction feature generates a localized pressure increase in the first adjacent passage at the cross passage opening, and wherein the first adjacent passage is at a lower pressure at the cross passage opening than the pressure of a second adjacent passage at the cross passage opening.

3. The turbine component of claim 2, wherein the obstruction feature is a surface of said wall and wherein the surface is approximately normal to fluid flow through the first adjacent passage.

4. The turbine component of claim 2, wherein the obstruction feature protrudes from a downstream edge of said cross passage relative to flow through said first adjacent passage.

5. The turbine component of claim 2, wherein the pressure balancing feature further comprises a ramp feature protruding from said shared wall into said second adjacent passage, wherein the ramp feature generates a localized pressure decrease in said second adjacent passage at the cross passage opening.

6. The turbine component of claim 5, wherein the ramp feature comprises a sloped surface protruding into said second adjacent passage, said sloped surface being at an obtuse angle relative to fluid flow through said second adjacent passage.

7. The turbine component of claim 5, wherein fluid flow through said first adjacent passage and said second adjacent passage is in opposing directions, and wherein said ramp feature protrudes into said second adjacent passage from an upstream edge of cross passage opening, relative to fluid flow through said second adjacent passage.

8. The turbine component of claim 5, wherein fluid flow through said first adjacent passage and said second adjacent passage are in the same direction, and wherein said ramp feature protrudes into said second adjacent passage along said shared wall upstream of said cross passage opening.

9. The turbine component of claim 1, wherein the pressure balancing feature comprises a ramp feature protruding from said shared wall into a second adjacent passage upstream of said cross passage opening, wherein the ramp feature generates a localized pressure decrease in said second adjacent passage at the cross passage opening.

10. The turbine component of claim 1, wherein the portion of said shared wall extends an entire length of the cross passage opening.

11. A method for minimizing cross passage flow in a gas turbine engine component comprising:

reducing a local pressure differential between two adjacent passages at a cross passage joining the two adjacent passages using a pressure balancing feature integral to a shared wall of said two adjacent passages, wherein a fluid pressure in a first of said two adjacent passages at said cross passage is lower than a pressure in a second of said two adjacent passages at said cross passage; and further comprising minimizing leakage through said cross passage using a leakage minimization feature, wherein the leakage minimization feature is a portion of the shared wall extending radially into said cross passage, relative to a radius of an engine incorporating the gas turbine engine component, and thereby reduces an area of said cross passage, and wherein the leakage minimization feature extends a full length of the cross passage.

12. The method of claim 11, wherein locally equalizing the pressure comprises increasing a pressure in a first passage of said two adjacent passages using an obstruction protruding from said shared wall into said first passage at a downstream edge of said cross passage, relative to flow through said first passage, thereby locally increasing the pressure in said first passage at the cross passage.

13. The method of claim 11, wherein locally equalizing the pressure comprises decreasing a pressure in said second passage of said two adjacent passages using a ramp feature protruding from said shared wall into said second passage at an upstream edge of said cross passage, relative to fluid flowing through said first passage.

14. The method of claim 11, wherein locally equalizing the pressure comprises decreasing a pressure in said second passage of said two adjacent passages using a ramp feature protruding from said shared wall into said second passage at an upstream edge of said cross passage, relative to fluid flowing through said second passage.

15. A gas turbine engine comprising:
a compressor section;
a combustor fluidly connected to the compressor section via a flow path;
a turbine section fluidly connected to the combustor via said flow path, wherein the turbine section includes at least one rotor;
a plurality of static components disposed circumferentially about said flow path radially outward of said at least one of said rotor, wherein at least one of the static component in the plurality of static components comprises:
a main body having an upstream end and a downstream end;
a cooling passage network interior to said main body, the cooling passage network including a plurality of cooling passages;
at least one cooling passage in said plurality of cooling passages being defined by an inlet, an outlet, and at least one shared passage wall, wherein said shared passage wall is a shared passage wall of two cooling passages in said plurality of cooling passage, said shared passage wall further comprising a cross passage opening connecting each passage partially defined by said shared passage wall; and said cross passage opening further including a pressure balancing feature operable to reduce a local pressure differential in a fluid pressure in each adjacent passage at the cross passage opening.

16. The gas turbine engine of claim 15, wherein the static or rotating component comprises a refractory metal core, and wherein said refractory metal core at least partially defines said cooling passage network.

17. The gas turbine engine of claim 15, wherein said pressure balancing feature comprises an obstruction feature protruding into flow of a first adjacent passage, wherein the obstruction feature generates a localized pressure increase in the first adjacent passage at the cross passage opening, and wherein the first adjacent passage is at a lower pressure at the cross passage opening than the pressure of a second adjacent passage at the cross passage opening.

18. The gas turbine engine of claim 15, wherein the pressure balancing feature further comprises a ramp feature protruding from said shared wall into said second adjacent passage, wherein the ramp feature generates a localized pressure decrease in said second adjacent passage at the cross passage opening.

19. The gas turbine engine of claim 15, wherein a fluid flow direction in each cooling passage in said cooling passage network is opposite a fluid flow direction of each adjacent cooling passage.

20. The gas turbine engine of claim 15, further comprising a leakage minimization feature at said cross passage opening, wherein said leakage minimization feature is a portion of said shared wall extending through said cross passage opening, and thereby restricting a height of said cross passage opening, and wherein the portion of said shared wall extends a full length of the cross passage opening.

* * * * *